(12) United States Patent
Jin et al.

(10) Patent No.: US 11,150,487 B2
(45) Date of Patent: Oct. 19, 2021

(54) STEREOSCOPIC DISPLAY DEVICE HAVING A BARRIER PANEL

(71) Applicant: LG Display Co., Ltd., Seoul (KR)

(72) Inventors: You-Yong Jin, Seoul (KR); Wook Jeon, Daejeon (KR); Ju-Hoon Jang, Paju-si (KR); Dong-Yeon Kim, Seoul (KR); Woon-Chan Moon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 583 days.

(21) Appl. No.: 16/123,362

(22) Filed: Sep. 6, 2018

(65) Prior Publication Data

US 2019/0079307 A1 Mar. 14, 2019

(30) Foreign Application Priority Data

Sep. 8, 2017 (KR) .......................... 10-2017-0114892

(51) Int. Cl.
*G02B 30/30* (2020.01)
*G02B 30/27* (2020.01)
(Continued)

(52) U.S. Cl.
CPC ............. *G02B 30/27* (2020.01); *G02B 30/30* (2020.01); *G02F 1/1343* (2013.01);
(Continued)

(58) Field of Classification Search
CPC ............... H04N 13/31; H04N 13/0409; G02B 27/2214; G02B 30/30
See application file for complete search history.

(56) References Cited

U.S. PATENT DOCUMENTS

| 7,359,105 B2 | 4/2008 | Jacobs et al. |
| 9,091,876 B2 | 7/2015 | Kim et al. |

(Continued)

FOREIGN PATENT DOCUMENTS

| CN | 104035261 A | 9/2014 |
| CN | 105745570 A | 7/2016 |

(Continued)

OTHER PUBLICATIONS

Office Action issued in corresponding CN Patent Application No. 201811019498.0 dated Aug. 31, 2020.
(Continued)

*Primary Examiner* — Yuzhen Shen
(74) *Attorney, Agent, or Firm* — Morgan, Lewis & Bockius LLP

(57) ABSTRACT

A stereoscopic display device has a barrier panel. The barrier panel of the stereoscopic display device may include sequentially stacked first channel electrodes, second channel electrodes, and third channel electrodes. Each of the third channel electrodes may be disposed between the second channel electrodes. A distance between the third channel electrodes may be the same as a horizontal width of each third channel electrode. Each of the first channel electrodes may include a first region overlapping with an end portion of the second channel electrode, and a second region overlapping with an end portion of the third channel electrode facing the end portion of the second channel electrodes overlapping with the first region of adjacent first channel electrode. Thus, in the stereoscopic display device, the number of stacked layers of the channel electrodes may be minimized, a proper viewing range for a stereoscopic image may be smoothly moved.

14 Claims, 6 Drawing Sheets

(51) Int. Cl.
*G02F 1/1343* (2006.01)
*G09G 3/22* (2006.01)
*H04N 13/366* (2018.01)
*H04N 13/31* (2018.01)
*G09G 3/00* (2006.01)

(52) U.S. Cl.
CPC ....... *G02F 1/134309* (2013.01); *G09G 3/003* (2013.01); *G09G 3/22* (2013.01); *H04N 13/31* (2018.05); *H04N 13/366* (2018.05); *G09G 2310/0264* (2013.01)

(56) References Cited

U.S. PATENT DOCUMENTS

| | | | |
|---|---|---|---|
| 2007/0176914 A1 | 8/2007 | Bae et al. | |
| 2007/0183015 A1* | 8/2007 | Jacobs | G02F 1/1323 359/245 |
| 2008/0259232 A1* | 10/2008 | Kim | G02F 1/133528 349/15 |
| 2013/0057539 A1* | 3/2013 | Kim | G02B 30/27 345/419 |
| 2013/0257855 A1* | 10/2013 | Kim | G02F 1/134309 345/419 |
| 2014/0085439 A1 | 3/2014 | Niwano et al. | |
| 2015/0365655 A1 | 12/2015 | Oka et al. | |
| 2016/0065954 A1 | 3/2016 | Son | |
| 2016/0070111 A1 | 3/2016 | Takama et al. | |
| 2016/0291358 A1* | 10/2016 | Kikuchi | G02F 1/133308 |
| 2017/0219836 A1 | 8/2017 | Hyodo et al. | |

FOREIGN PATENT DOCUMENTS

| | | |
|---|---|---|
| CN | 106932911 A | 7/2017 |
| CN | 107037596 A | 8/2017 |
| DE | 102011057102 A1 | 3/2013 |
| GB | 2494214 A | 3/2013 |
| JP | 2007-293270 A | 11/2007 |
| JP | 2014-066956 A | 4/2014 |
| JP | 2017-138447 A | 8/2017 |
| KR | 10-2013-0025767 A | 3/2013 |
| KR | 10-2015-0026029 A | 3/2015 |
| KR | 10-2016-0028626 A | 3/2016 |
| TW | 201541123 A | 11/2015 |
| WO | 2015/072193 A1 | 5/2015 |

OTHER PUBLICATIONS

Office Action issued in corresponding IN Patent Application No. 201814033785 dated Jul. 9, 2018.
Office Action issued in counterpart Korean Patent Application No. 10-2017-0114892 dated Oct. 22, 2018.
Office Action issued in corresponding Japanese Patent Application No. 2018-166547, dated Jul. 18, 2019.
Office Action issued in corresponding DE Patent Application No. 102018121578.9 dated Nov. 6, 2020.
Combined Search and Examination Report under Sections 17 and 18(3), issued in corresponding Patent Application No. GB1814610.0, dated Mar. 7, 2019.
Office Action issued in corresponding Taiwanese Patent Application No. 107131560, dated Apr. 16, 2019.

* cited by examiner 900　740　100　710　200　720

STEREOSCOPIC DISPLAY DEVICE HAVING A BARRIER PANEL

This application claims the priority benefit of Korean Patent Application No. 10-2017-0114892, filed on Sep. 8, 2017, which is hereby incorporated by reference as if fully set forth herein.

BACKGROUND

Technical Field

The present disclosure relates to a stereoscopic display device which realizes a stereoscopic image using a barrier panel.

Discussion of the Related Art

Generally, a display device includes a display panel which realizes an image. For example, the display device may include a liquid crystal panel having a liquid crystal, and/or an OLED (organic light-emitting diode) panel having an organic light-emitting element.

The display device may realize a stereoscopic image using a position difference of viewer's eyes. For example, a stereoscopic display device may differently provide an image realized by the display panel to the left eye and the right eye of viewer using the binocular disparity.

The stereoscopic display device may include an eyeglasses type which uses a shutter, and a non-glasses type which uses a barrier panel. The barrier panel may separate the image provided to the left eye and the right eye of the viewer by using a path difference of light emitted from the display panel. For example, the barrier panel may form transmitting regions and blocking regions by adjusting voltage applied to channel electrodes which are disposed at regular intervals. Each of the blocking regions may be disposed between the transmitting regions.

The barrier panel may shift a proper viewing range for a stereoscopic image according to a location of the viewer. For example, the barrier panel may adjust the voltage applied to each channel electrode to move the transmitting regions and the blocking regions according to the location of the viewer. The moving distance of the transmitting regions and the blocking regions may be influenced by the intervals of the channel electrodes. For example, when the channel electrodes of the barrier panel concentrate, the proper viewing range according to the location of the viewer may be smoothly moved.

However, in order to prevent malfunction due to the voltage applied to adjacent channel electrodes, a distance between the channel electrodes must be larger than a certain value. Thus, in the stereoscopic display device, the movement of the proper viewing range may become unnatural.

The stereoscopic display device may include the channel electrodes formed in a multi-layer structure so that the distance between adjacent channel electrodes may be sufficiently secured, and the proper viewing range may be smoothly moved. However, since a step of forming the channel electrodes may include a patterning process, such as a photolithograph process, a method of forming the stereoscopic display device including the stacked channel electrodes may be complicated. And, when the number of stacked layers of the channel electrodes is increased, the possibility of misalignment may be increased, so that the process efficiency of the stereoscopic display device may be decreased.

SUMMARY

Accordingly, embodiments of the present disclosure are directed to a stereoscopic display device that substantially obviates one or more of the problems due to limitations and disadvantages of the related art.

An aspect of the present disclosure is to provide a stereoscopic display device in which a proper viewing range according to a location of a viewer may be smoothly moved without the decrease of the process efficiency.

Another aspect of the present disclosure is to provide a stereoscopic display device in which liquid crystal regions driven by each channel electrode may be disposed at regular intervals, and the number of the stacked layers of channel electrodes may be minimized.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a stereoscopic display device comprises a display driver driving a display panel. A barrier panel is disposed on the display panel. The barrier panel includes first channel electrodes, second channel electrodes and third channel electrodes, which are sequentially stacked. Each of the first channel electrodes includes a first region overlapping with an end portion of the second channel electrode, and a second region disposed outside the first region. Each of the third channel electrodes covers a space between the second channel electrodes. A distance between the third channel electrodes is the same as a horizontal width of the third channel electrode. The first channel electrodes, the second channel electrodes and the third channel electrodes of the barrier panel are controlled by a barrier driver.

The barrier driver may apply a voltage to each first channel electrode same as a voltage applied to the second channel electrode including an end portion which overlaps with the first region of the corresponding first channel electrode.

Each of the second channel electrodes may include an overlapping region overlapping with the third channel electrode.

A horizontal distance of the overlapping region of each second channel electrode may be the same as a horizontal distance of the first region.

A horizontal distance of the second region may be the same as a horizontal distance of the first region.

A horizontal width of each first channel electrode may be larger than a distance between the second channel electrodes.

Each of the third channel electrodes may include a side surface overlapping with the first channel electrode.

The side surface of each third channel electrode may be vertically aligned with a side surface of the second channel electrode.

A horizontal width of each second channel electrode may be larger than a distance between the third channel electrodes.

The distance between the first channel electrodes may be larger than the distance between the third channel electrodes.

A location of a viewer may be detected by a viewing location detecting part. The barrier driver may adjust the voltage applied to the first channel electrode, the second channel electrode and the third channel electrode according to a signal of the viewing location detecting part.

The display panel may include a lower display substrate, a lower emission electrode, a light-emitting layer, an upper emission electrode and an upper display substrate, which are sequentially stacked.

The first channel electrodes, the second channel electrodes and the third channel electrodes may cross an active area. The barrier panel may include link lines being extended along an edge of the active area. The link lines may be asymmetric shape with respect to the center of the active area.

Each of the first channel electrodes, the second channel electrodes and the third channel electrodes may be connected to one of the link lines. Each of the first channel electrodes, the second channel electrodes and the third channel electrodes may form a closed loop with the corresponding link line.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
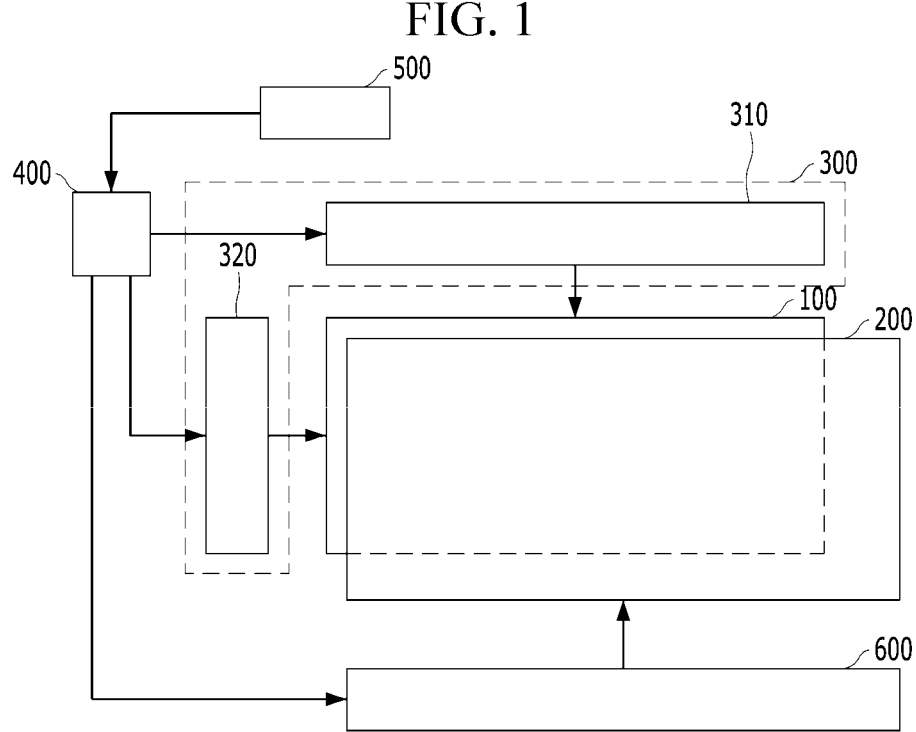
FIG. 1 is a view schematically showing a stereoscopic display device according to an exemplary embodiment of the present disclosure.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element from another element. However, the first element and the second element may be arbitrarily named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Exemplary Embodiment

Figure 2:
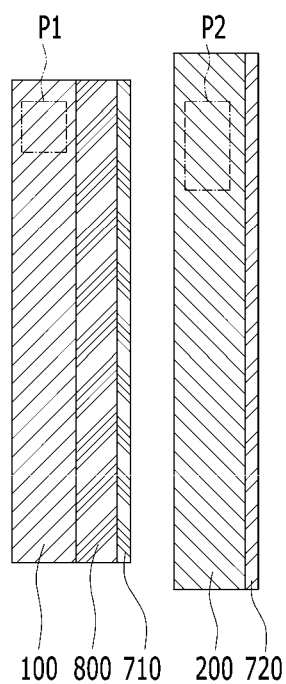
FIG. 2 is a view showing a display panel and a barrier panel of the stereoscopic display device according to the exemplary embodiment of the present disclosure.
Figure 3:
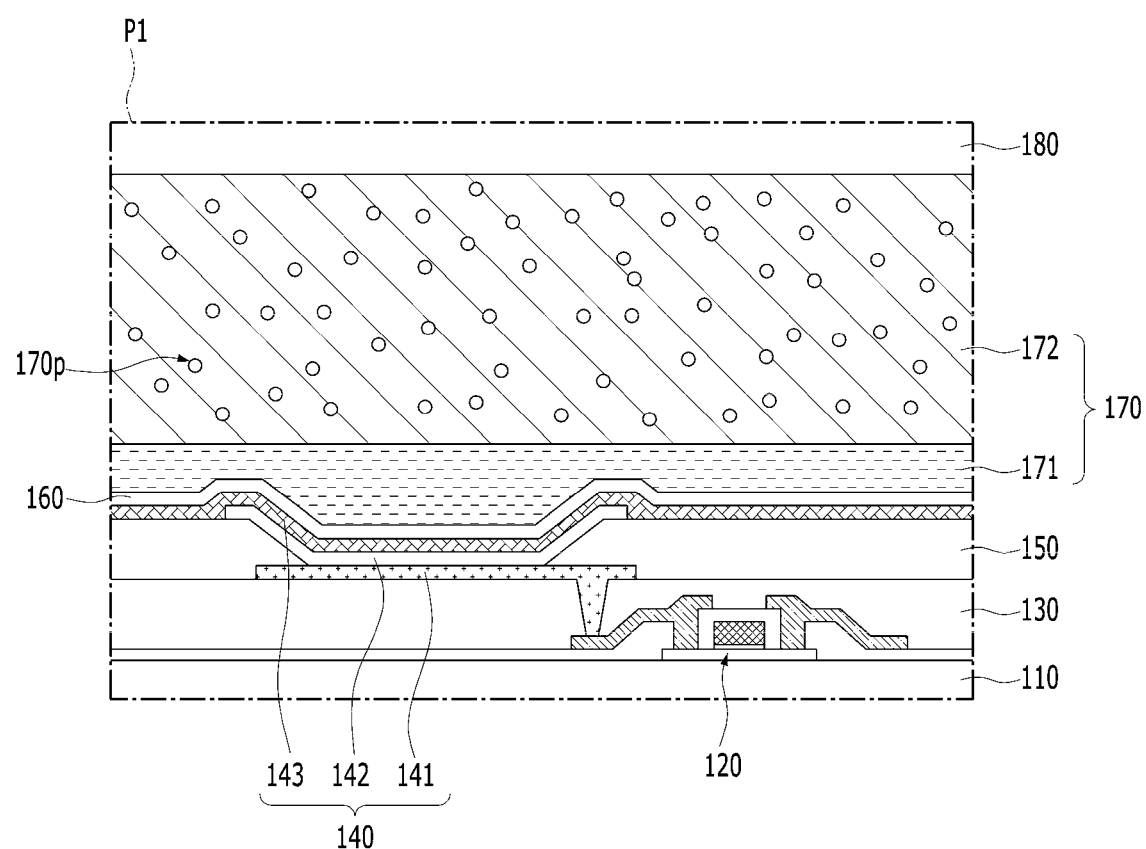
FIG. 3 is an enlarged view of P1 region in FIG. 2.
Figure 4:
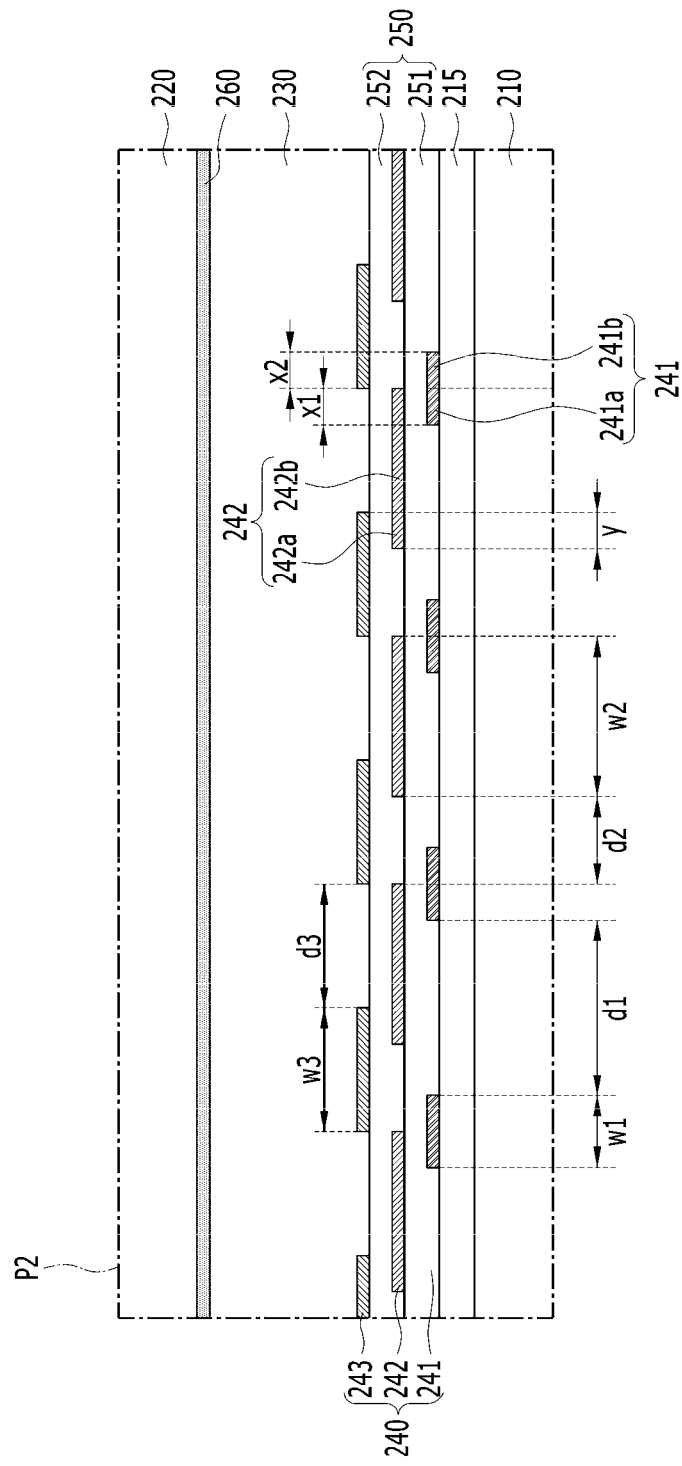
FIG. 4 is an enlarged view of P2 region in FIG. 2.

FIG. 1 is a view schematically showing a stereoscopic display device according to an exemplary embodiment of the present disclosure. FIG. 2 is a view showing a display panel and a barrier panel of the stereoscopic display device according to the exemplary embodiment of the present disclosure. FIG. 3 is an enlarged view of P1 region in FIG. 2. FIG. 4 is an enlarged view of P2 region in FIG. 2.

Referring FIGS. 1 to 4, the stereoscopic display device according to the exemplary embodiment of the present disclosure may include a display panel 100, a barrier panel 200, a display driver 300, a timing controller 400, a viewer location detecting part 500 and a barrier driver 600.

The display panel 100 may realize an image which is provided to a viewer. For example, the display panel 100 may include a lower display substrate 110, a light-emitting element 140 and an upper display substrate 180, which are sequentially stacked. The light-emitting element 140 may generate light displaying a specific color to realize the image. For example, the light-emitting element 140 may include a lower emission element 141, a light-emitting layer 142 and an upper emission element 143, which are sequentially stacked. The light-emitting layer 142 may include an organic emission material or an inorganic emission material. For example, the display panel 100 of the stereoscopic display device according to the exemplary embodiment of the present disclosure may be an OLED panel including an organic light-emitting element.

The display panel 100 may further include a thin film transistor 120 between the lower display substrate 110 and the light-emitting element 140, an over-coat layer 130 covering the thin film transistor 120, and a bank insulating layer 150 covering an edge of the lower emission electrode 141. The over-coat layer 130 may remove a thickness difference due to the thin film transistor 120. The light-emitting element 140 may be disposed on the over-coat layer 130. For example, the over-coat layer 130 may include a contact hole exposing a drain electrode of the thin film transistor 120.

The display panel 100 may further include an upper passivation layer 160 and an adhesive layer 170 which are disposed between the light-emitting element 140 and the upper display substrate 180. The upper passivation layer 160 may prevent damage of the light-emitting element 140 due to the external impact and moisture. The adhesive layer 170 may be disposed between the upper passivation layer 160 and the upper display substrate 180. The upper display substrate 180 may be coupled to the lower display substrate 110 in which the upper passivation layer 160 is formed, by the adhesive layer 170. The adhesive layer 170 may have a multi-layer structure. For example, the adhesive layer 170 may include a lower adhesive layer 171 and an upper adhesive layer 172. The upper adhesive layer 172 may be disposed between the lower adhesive layer 171 and the upper display substrate 180. The upper adhesive layer 172 may include a moisture-absorbing material 170p. The lower adhesive layer 171 may relieve the stress applied to the light-emitting element 140 due to the expansion of the moisture-absorbing material 170p.

The barrier panel 200 may be disposed on the display panel 100. The barrier panel 200 may separate the image realized by the display panel 100 to differently provide the image to the left eye and the right eye of the viewer. For example, the image realized by the display panel 100 may be stereoscopically recognized to the viewer by the barrier panel 200.

The barrier panel 200 may selectively transmit or block light. For example, the barrier panel 200 may include a lower barrier substrate 210, an upper barrier substrate 220, a liquid-crystal layer 230, channel electrodes 240, barrier insulating layers 250 and a common electrode 260. The liquid crystal layer 230 may include TN type liquid crystal or ECB type liquid crystal.

The lower barrier substrate 210 and the upper barrier substrate 220 may include an insulating material. The lower barrier substrate 210 and the upper barrier substrate 220 may include a transparent material. For example, the lower barrier substrate 210 and the upper barrier substrate 220 may include glass.

The channel electrodes 240 may be disposed between the lower barrier substrate 210 and the liquid crystal layer 230. The channel electrodes 240 may have a three-layer structure. For example, the channel electrodes 240 may include first channel electrodes 241, second channel electrodes and third channel electrodes 243, which are sequentially stacked.

Each layer of the channel electrodes 240 may be insulated by the barrier insulating layers 250. For example, the barrier insulating layers 250 may include a first barrier insulating layer 251 between the first channel electrodes 241 and the second channel electrodes 242, and a second barrier insulating layer 252 between the second channel electrodes 242 and the third channel electrodes 243. The barrier insulating layer 250 may include an insulating material. For example, the barrier insulating layer 250 may include silicon oxide or silicon nitride. The second barrier insulating layer 252 may include a material same as the first barrier insulating layer 251.

Each of the first channel electrodes 241 may include a first region 241a and a second region 241b. A horizontal distance x2 of the second region 241b may be the same as a horizontal distance x1 of the first region 241a. For example, the horizontal distance x1 of the first region 241a and the horizontal distance x2 of the second region 241b may be a half of a horizontal width w1 of each first channel electrode 241.

The first channel electrodes 241 may be disposed at regular intervals. The first channel electrodes 241 may include a conductive material. The first channel electrodes 241 may include a transparent material. For example, the first channel electrodes 241 may be formed of ITO (Indium Tin Oxide) or IZO (Indium Zinc Oxide).

Each of the second channel electrodes 242 may include an end portion overlapping with the first region 241a of the first channel electrode 241. The second regions 241b of the first channel electrodes 241 may be exposed by the second channel electrodes 242. For example, another end portion of each second channel electrode 242 may not overlap with the first channel electrodes 241.

A horizontal width w2 of each second channel electrode 242 may be larger than the horizontal width w1 of each first channel electrode 241. The second channel electrodes 242 may be disposed at regular intervals. For example, a distance d1 between the first channel electrodes 241 may be larger than a distance d2 between the second channel electrodes 242.

The second channel electrodes 242 may include a conductive material. The second channel electrodes 242 may include a transparent material. For example, the second channel electrodes 242 may be formed of ITO or IZO. The second channel electrodes 242 may include a material same as the first channel electrodes 241.

Each of the third channel electrodes 243 may be disposed between the second channel electrodes 242. Each of the third channel electrodes 243 may include an end portion overlapping with the second region 241b of the first channel electrode 241. The end portion of each third channel electrode 243 overlapping with the second region 241b may face the end portion of each second channel electrode 242 overlapping with the first region 241a of the corresponding first channel electrode 241. The end portion of each second channel electrode 242 overlapping with the first region 241a may not overlap the third channel electrodes 243. For example, each of the third channel electrodes 243 may include a side surface overlapping with the first channel electrode 241.

Each of the third channel electrodes 243 may cover a space between the second channel electrodes 242. For example, another end of each third channel electrode 243 may overlap the second channel electrode 242. For example, each of the second channel electrodes 242 may include an overlapping region 242a overlapping with the third channel electrode 243, and a driving region 242b exposed by the third channel electrodes 243. The driving region 242b of each second channel electrode 242 may include the end portion of the corresponding second channel region 242 overlapping with the first region 241a.

A distance d3 between the third channel electrodes 243 may be the same as a horizontal width w3 of each third channel electrode 243. For example, the horizontal width w2 of each second channel electrode 242 may be larger than the distance d3 between the third channel electrodes 243. Thus, in the stereoscopic display device according to the exemplary embodiment of the present disclosure, a liquid crystal region driven by each third channel electrode 243 may have a horizontal distance same as a horizontal distance of a liquid crystal region driven by a driving region 242b of each second channel electrode 242 exposed by the third channel electrodes 243. Therefore, in the stereoscopic display device according to the exemplary embodiment of the present disclosure, the transmitting regions and/or the blocking regions of the barrier panel may be moved by a predetermined horizontal distance, by adjusting a voltage applied to the channel electrodes 240.

Since the second channel electrodes 242 or the third channel electrodes 243 may be disposed between the first channel electrodes 241 and the liquid crystal layer 230, the first channel electrodes 241 may not influence the formation of the transmitting regions and the blocking regions. That is, the stereoscopic display device according to the exemplary embodiment of the present disclosure may include the transmitting regions and the blocking regions formed by the second channel electrodes 242 and the third channel electrodes 243 which are insulated by the second barrier insulating layer 252. And, in the stereoscopic display device according to the exemplary embodiment of the present disclosure, each of the third channel electrodes 243 may include a side surface vertically aligned with a side surface of the second channel electrode 242 on the first channel electrode 241. Thus, in the stereoscopic display device according to the exemplary embodiment of the present disclosure, the distance d2 between the second channel electrodes 242 and the distance d3 between the third channel electrodes 243 may be sufficiently secured. Therefore, in the stereoscopic display device according to the exemplary embodiment of the present disclosure, the transmitting regions and the blocking regions which are not influenced by adjacent channel electrodes 240 may be formed only by the channel electrodes 240 having the two-layer structure, so that the thickness increase due to stacking of the channel electrodes 240 may be minimized.

The horizontal distance x1 of the first region 241a may be the same as the horizontal distance y of the overlapping region 242a. For example, the horizontal width w1 of each first channel electrode 241 may be twice the horizontal distance y of the overlapping region 242a. Thus, even when a side surface of the driving region 242b of the each second channel electrode 242 is spaced away from the corresponding side surface of the third channel electrode 243 due to the misalignment of the third channel electrodes 243, the stereoscopic display device according to the exemplary embodiment of the present disclosure may drive all region of the liquid crystal layer 230 using the first channel electrodes 241. Therefore, in the stereoscopic display device according to the exemplary embodiment of the present disclosure, the process margin may be improved. The horizontal width w1 of each first channel electrode 241 may be larger than the distance d2 between the second channel electrodes 242. Thereby, in the stereoscopic display device according to the exemplary embodiment of the present disclosure, even when a space between the second channel electrodes 242 is not covered by the corresponding third channel electrode 243, all region of the liquid crystal layer 230 may be controlled.

The third channel electrodes 243 may include a conductive material. The third channel electrodes 243 may include a transparent material. For example, the third channel electrodes 243 may be formed of ITO or IZO. The third channel electrodes 243 may include a material same as the first channel electrodes 241 and the second channel electrodes 242.

The common electrode 260 may be disposed between the liquid crystal layer 230 and the upper barrier substrate 220. For example, the common electrode 260 may be in direct contact with the upper barrier substrate 220. The common electrode 260 may form a vertical electric field with the channel electrodes 240. The liquid crystal in the liquid crystal layer 230 may be rotated by the vertical electric field formed between the channel electrodes 240 and the common electrode 260.

The common electrode 260 may include a conductive material. The common electrode 260 may include a transparent material. For example, the common electrode 260 may be formed of ITO or IZO.

The display driver 300 may drive the display panel 100. The display panel 100 may receive signals for realizing the image from the display driver 300. For example, the display driver 300 may include a data driver 310 and a scan driver 320.

The data driver 310 may provide a data signal to the display panel 100. The scan driver 320 may sequentially apply a scan signal to the display panel 100. The data signal provided by the data driver 310 may be synchronized with the scan signal applied by the scan driver 320.

The timing controller 400 may provide a signal for the operation of the display drive 300. For example, the timing controller 400 may provide digital video data and source timing control signal to the data driver 310. The scan driver 320 may receive clock signals, reset clock signals and start signals from the timing controller 400.

The viewing location detecting part 500 may detect the location of the viewer. For example, the viewing location detecting part 500 may detect the position information of the viewer viewing the image realized by the display panel 100 and the barrier panel 200. The viewing location detecting part 500 may include a camera.

The barrier driver 600 may drive the barrier panel 200. For example, the barrier driver 600 may apply a voltage to the channel electrodes 240, individually or region by region. The barrier driver 600 may control the barrier panel 200 according to the location of the viewer. For example, the barrier driver 600 may adjust a voltage applied to the channel electrodes 240 according to a signal of the viewing location detecting part 500, so that the transmitting regions and the blocking regions of the barrier panel 200 may be moved.

Figure 5:
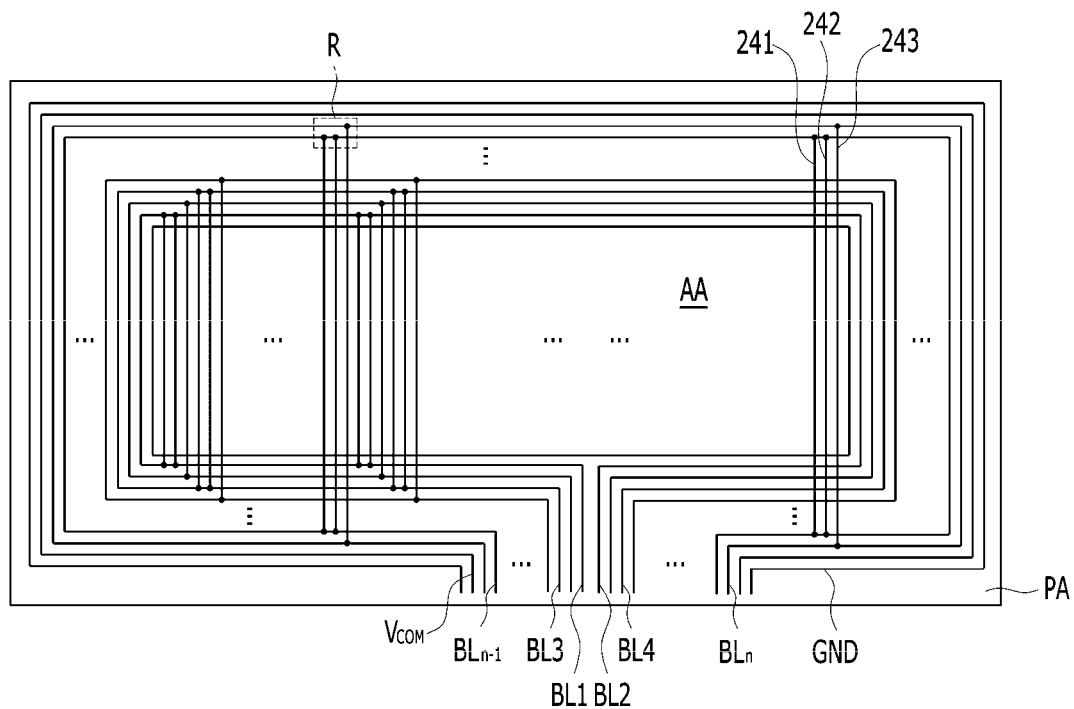
FIG. 5 is a view schematically showing wiring lines in the barrier panel of the stereoscopic display device according to the exemplary embodiment of the present disclosure.

FIG. 5 is a view schematically showing wiring lines in the barrier panel of the stereoscopic display device according to the exemplary embodiment of the present disclosure.

Referring FIGS. 4 and 5, link lines BL1-BLn connected to the barrier driver 600 may be disposed on the barrier panel 200. The link lines BL1-BLn may be disposed on a peripheral area PA of the barrier panel 200. The peripheral area PA of the barrier panel 200 may be disposed outside an active area AA of the barrier panel 200. The active area AA may be a region in which the transmitting regions and the blocking regions may be formed by the channel electrodes 240. For example, the channel electrodes 240 may cross the active area AA.

The link lines BL1-BLn may be extended along an edge of the active area AA. Each of the channel electrodes 240 may be connected to one of the link lines BL1-Bln, so that each channel electrode 240 may form a closed loop with the corresponding link line BL1-BLn.

Wiring lines for supplying power may be disposed on the peripheral area PA of the barrier panel 200. For example, a common voltage supply line Vcom and a ground line GND may be disposed in the peripheral area PA of the barrier panel 200. The common voltage supply line Vcom and the ground line GND may be disposed outside the link lines BL1-BLn. The common voltage supply line Vcom and the ground line GND may be extended along the link lines BL1-BLn.

In the stereoscopic display device according to the exemplary embodiment of the present disclosure, each of the first channel electrodes 241 may be connected to the link line BL1-BLn which is connected to the second channel electrode 242 close to the corresponding first channel electrode 241, as shown in FIG. 5. Thus, in the stereoscopic display device according to the exemplary embodiment of the present disclosure, even when the side surface of the driving region 242b of each second channel electrode 242 is not aligned with the side surface of the third channel electrode 243 due to misalignment, a region of the liquid crystal layer 230 between the third channel electrodes 243 may be function as a single transmitting region or a blocking region by the first channel electrodes 241. Therefore, in the stereoscopic display device according to the exemplary embodiment of the present disclosure, the defect rate due to misalignment may be greatly reduced, and the process margin may be greatly increased.

Accordingly, in the stereoscopic display device according to the exemplary embodiment of the present disclosure, the channel electrodes 240 for forming the transmitting regions and the blocking regions of the barrier panel 200 may have the two-layer structure, and the side surface of each third channel electrode 243 may be vertically aligned with the side surface of the second channel electrode 242 including an end portion facing the corresponding the side surface of the corresponding third channel electrode 243 on the first channel electrode 241. Thus, in the stereoscopic display device according to the exemplary embodiment of the present disclosure, the thickness increase may be minimized, the distance between adjacent channel electrodes 240 may be sufficiently secured, and the defect due to the misalignment may be greatly decreased. Therefore, in the stereoscopic display device according to the exemplary embodiment of the present disclosure, the proper viewing range for the stereoscopic image may be smoothly moved according to the location of the viewer. Also, in the stereoscopic display device according to the exemplary embodiment of the present disclosure, the process efficiency may be increased.

In the stereoscopic display device according to the exemplary embodiment of the present disclosure, the link lines BL1-BLn being extended along an edge of the active area AA may be asymmetric shape with respect to the center of the active area AA. For example, end portions of the link lines BL1-BLn connected to the barrier driver 600 may be slightly moved in a direction of a side surface of the barrier panel 200 from the center of the barrier panel 200, as shown in FIG. 5. Thus, in the stereoscopic display device according to the exemplary embodiment of the present disclosure, end portions of the link lines BL1-BLn connected to the barrier driver 600 may not influence the connection structure of the channel electrodes 240. Therefore, in the stereoscopic display device according to the exemplary embodiment of the present disclosure, the process efficiency may be improved.

Figure 6:
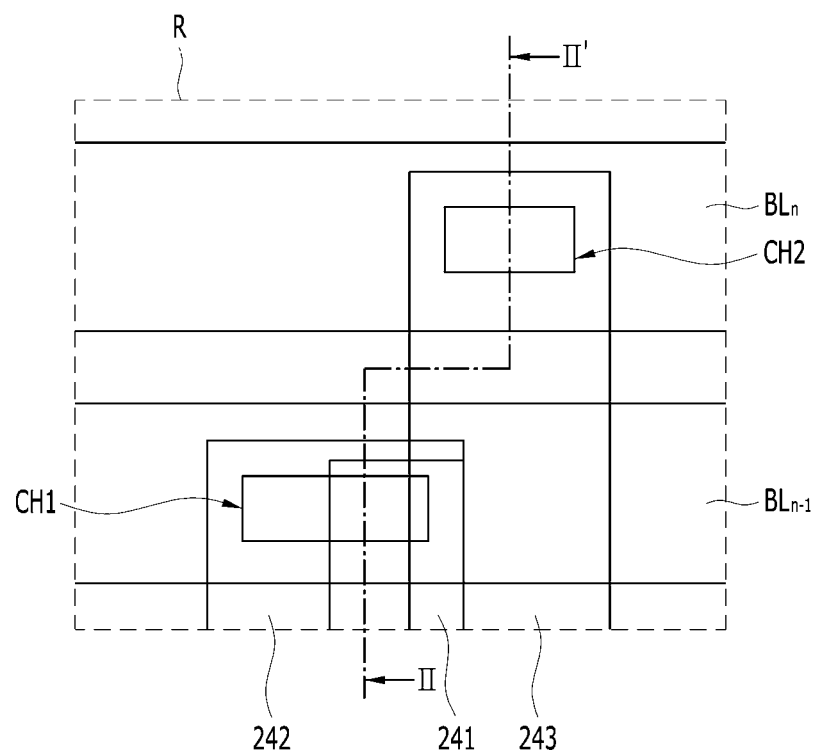
FIG. 6 is an enlarged view of R region in FIG. 5.
Figure 7:
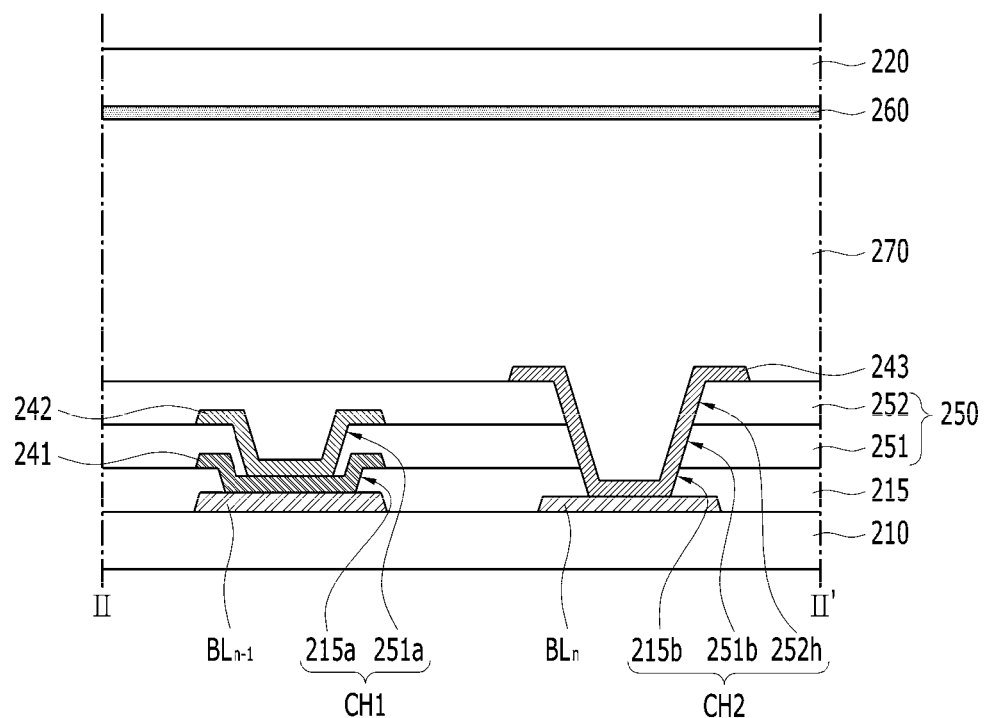
FIG. 7 is a view taken along II-II' of FIG. 6.

The stereoscopic display device according to the exemplary embodiment of the present disclosure is described that the first channel electrode 241 is connected to the link line BL1-BLn same as the second channel electrode 242 disposed close to the corresponding first channel electrode 241, in order to apply the same voltage to the first channel electrode 241 and the second channel electrode 242 which includes an end portion overlapping with the first region 241a of the corresponding first channel electrode 241. However, the stereoscopic display device according to another exemplary embodiment of the present disclosure may include a different structure for applying the same voltage to the first channel electrode 241 and the second channel electrode 242 disposed adjacent the corresponding first channel electrode 241. For example, in the stereoscopic display device according to another exemplary embodiment of the present disclosure, the link lines BL1-BLn and a barrier buffer layer 215 covering the link lines BL1-BLn may be disposed between the lower barrier substrate 210 and the first channel electrodes 241, as shown in FIGS. 6 and 7. The barrier buffer layer 215 may include an insulating material. For example, the barrier buffer layer 215 may include silicon oxide.

The barrier buffer layer 215 may include a first lower contact hole 215a and a second contact hole 215b. The first channel electrodes 241 may be connected to the corresponding link line BLn-1 through the first lower contact hole 215a. The second lower contact hole 215b may expose a portion of the link line BLn connected to the third channel electrode 243. The first barrier insulating layer 251 disposed on the barrier buffer layer 215 may include a first intermediate contact hole 251a and a second intermediate contact hole 251b. The first intermediate contact hole 251a may overlap the first lower contact hole 215a. The second channel electrodes 242 may be connected to the corresponding first channel electrode 241 through the first intermediate contact hole 251a. For example, a first electrode contact hole CH1 consisting of the first lower contact hole 215a and the first intermediate contact hole 251a may be a shape extending in a widthwise direction of the second channel electrodes 242. The second intermediate contact hole 251b may overlap the second lower contact hole 215b. The second barrier insulating layer 252 disposed on the first barrier insulating layer 251 may include an upper contact hole 252h. The upper contact hole 252h may overlap the second intermediate contact hole 251b. The third channel electrode 243 may be connected to the corresponding link line BLn through a second electrode contact hole CH2 consisting of the second lower contact hole 215b, the second intermediate contact hole 251b and the upper contact hole 252h. Thus, in the stereoscopic display device according to another exemplary embodiment of the present disclosure, the structure connecting the first channel electrode 241 and the second channel electrode 242 disposed adjacent the corresponding first channel electrode 241 to the same link line BL1-BLn may be simplified. Therefore, in the stereoscopic display device according to another exemplary embodiment of the present disclosure, the process efficiency may be greatly increased.

The stereoscopic display device according to the exemplary embodiment of the present disclosure may include a structure for preventing the reflection of the external light. For example, the stereoscopic display device according to the exemplary embodiment of the present disclosure may further include a quarter-wave plate 800 between the display panel 100 and a front linear polarizer 710, as shown in FIG. 2. The quarter-wave plate 800 may be in direct contact with the display panel 100 and the front linear polarizer 710.

Figure 8:
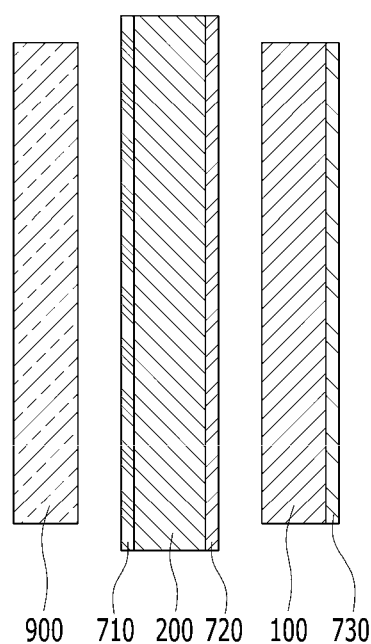
FIGS. 8 and 9 are views respectively showing the display device according to another exemplary embodiment of the present disclosure.

The stereoscopic display device according to the exemplary embodiment of the present disclosure is described that the barrier panel 200 is disposed on the display panel 100 including the light-emitting element 140. However, in the stereoscopic display device according to another exemplary embodiment of the present disclosure, the barrier panel 200 may be disposed between the display panel 100 and the light-emitting element 900, as shown in FIG. 8. For example, the display panel 100 of the stereoscopic display device according to another exemplary embodiment of the present disclosure may be a liquid crystal panel. The light-emitting element 900 may function as a backlight unit. A front linear polarizer 710 may be disposed between the barrier panel 200 and the light-emitting element 900 and may be in direct contact with the barrier panel 200. A rear linear polarizer 720 may be disposed between the barrier panel 200 and the display panel 100 and may be in direct contact with the barrier panel 200. An image linear polarizer 730 may be disposed on an outer surface of the display panel 100. Thus, in the stereoscopic display device according to another exemplary embodiment of the present disclosure, the proper viewing range for the stereoscopic image may be smoothly moved according to the location of the viewer regardless of the relative position of the display panel 100 and the barrier panel 200.

Figure 9:
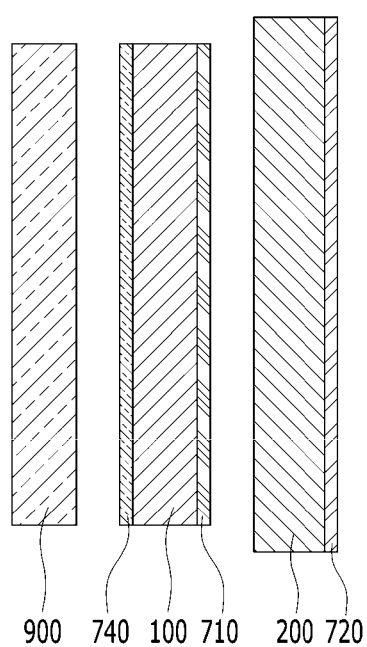

The stereoscopic display device according to another exemplary embodiment of the present disclosure is described that the barrier panel 200 is disposed between the light-emitting element 900 and the display panel 100. However, in the stereoscopic display device according to further another exemplary embodiment of the present disclosure, the display panel 100 may be disposed between the light-emitting element 900 and the barrier panel 200, as shown in FIG. 9. An image linear polarizer 740 may be disposed between the light-emitting element 900 and the display panel 100. The image linear polarizer 740 and the front linear polarizer 710 may be in direct contact with the display panel 100. Thus, the stereoscopic display device according to further another exemplary embodiment of the present disclosure may smoothly provide the stereoscopic image to the moving viewer in the display panel 100 and the barrier panel 200 at various positions.

As a result, the stereoscopic display device according to the embodiments of the present disclosure may include first channel electrodes, second channel electrodes each including an end portion overlapping with a portion of the first channel electrode, and third channel electrodes covering a space between the second channel electrodes, wherein a distance between the third channel electrodes may be the same as a horizontal width of each third channel electrode. Thus, in the stereoscopic display device according to the embodiments of the present disclosure, liquid crystal regions driven by the channel electrodes may be disposed at regular intervals. Also, in the stereoscopic display device according to the embodiments of the present disclosure, the defect due to the misalignment of the second channel electrodes and the third channel electrodes may be prevented. Therefore, in the stereoscopic display device according to the embodiments of the present disclosure, the number of the stacked layers of the channel electrodes may be minimized, and the proper viewing range for the stereoscopic image may be smoothly moved.

It will be apparent to those skilled in the art that various modifications and variations can be made in the stereoscopic display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A stereoscopic display device, comprising:
    a display panel;
    a barrier panel on the display panel, the barrier panel including first channel electrodes, second channel electrodes, third channel electrodes, a liquid-crystal layer, and a common electrode, which are sequentially stacked between a lower barrier substrate and an upper barrier substrate; and
    a barrier driver configured to control the first channel electrodes, the second channel electrodes and the third channel electrodes,
    wherein each of the first channel electrodes includes:
        a first region overlapping with an end portion of the second channel electrode; and
        a second region disposed outside the first region,
    wherein each of the third channel electrodes includes a portion disposed between the second channel electrodes, and
    wherein a distance between the third channel electrodes is the same as a horizontal width of each third channel electrode.

2. The stereoscopic display device according to claim 1, wherein the barrier driver is further configured to apply a voltage to each first channel electrode same as a voltage applied to the second channel electrode including an end portion that overlaps with the first region of the corresponding first channel electrode.

3. The stereoscopic display device according to claim 1, wherein each of the second channel electrodes includes an overlapping region overlapping with the third channel electrode.

4. The stereoscopic display device according to claim 3, wherein a horizontal distance of the overlapping region is the same as a horizontal distance of the first region.

5. The stereoscopic display device according to claim 1, wherein a horizontal distance of the second region is the same as a horizontal distance of the first region.

6. The stereoscopic display device according to claim 5, wherein a horizontal width of each first channel electrode is larger than a distance between the second channel electrodes.

7. The stereoscopic display device according to claim 5, wherein each of the third channel electrodes includes a side surface overlapping with the first channel electrode.

8. The stereoscopic display device according to claim 7, wherein the side surface of each third channel electrode is vertically aligned with a side surface of the second channel electrode.

9. The stereoscopic display device according to claim 1, wherein a horizontal width of each second channel electrode is larger than a distance between the third channel electrodes.

10. The stereoscopic display device according to claim 1, wherein a distance between the first channel electrodes is larger than a distance between the second channel electrodes.

11. The stereoscopic display device according to claim 1, further comprising:
    a display driver driving the display panel; and
    a viewing location detecting part detecting a location of a viewer,
    wherein the viewing location detecting part is electrically connected to the display driver and the barrier driver, and
    wherein the barrier driver is further configured to adjust a voltage applied to the first channel electrodes, the second channel electrodes, and the third channel electrodes according to a signal of the viewing location detecting part.

12. The stereoscopic display device according to claim 1, wherein the display panel includes a lower display substrate, a lower emission element, a light-emitting layer, an upper emission element and an upper display substrate, which are sequentially stacked.

13. The stereoscopic display device according to claim 1, wherein:
   the barrier panel further includes link lines disposed outside an active area that the first channel electrodes, the second channel electrodes, and the third channel electrodes cross;
   the link lines are extended along an edge of the active area; and
   the link lines are asymmetric with respect to the center of the active area.

14. The stereoscopic display device according to claim 13, wherein:
   each of the first channel electrodes, the second channel electrodes, and the third channel electrodes is connected to one of the link lines; and
   each of the first channel electrodes, the second channel electrodes, and the third channel electrodes forms a closed loop with the corresponding link line.

* * * * *